United States Patent
Hurd et al.

(10) Patent No.: US 6,352,789 B1
(45) Date of Patent: Mar. 5, 2002

(54) BRAZING SHEET AND METHOD OF MAKING SAME

(75) Inventors: Timothy John Hurd, Akersloot; Nicolaas Dirk Adrianus Kooij, Nieuwegein, both of (NL); Achim Bürger, Höhr Grenzhausen; Klaus Vieregge, Neuwied, both of (DE)

(73) Assignee: Corus Aluminium Walzprodukte GmbH, Koblenz (DE)

( * ) Notice: Subject to any disclaimer, the term of this patent is extended or adjusted under 35 U.S.C. 154(b) by 0 days.

(21) Appl. No.: 09/539,777

(22) Filed: Mar. 31, 2000

(30) Foreign Application Priority Data

Apr. 12, 1999 (EP) .............................. 99201095
Sep. 21, 1999 (EP) .............................. 99203081

(51) Int. Cl.$^7$ .............................. B32B 15/20; C22F 1/04
(52) U.S. Cl. .................. 428/654; 148/523; 148/535; 148/552; 148/691; 148/692; 148/438; 420/537; 420/538; 420/550; 420/551; 420/552; 420/553
(58) Field of Search .............................. 428/654, 34.1; 138/143; 165/133, 180, 905; 148/523, 535, 552, 691, 692, 438; 420/537, 538, 550, 551, 552, 553

(56) References Cited

U.S. PATENT DOCUMENTS 4,649,087 A * 3/1987 Scott et al. .................. 428/654
5,292,595 A * 3/1994 Yamauchi et al ........... 428/654

FOREIGN PATENT DOCUMENTS

| EP | 0566798 | 8/1993 | | |
| EP | 0712681 | 5/1996 | | |
| EP | 0718072 | 6/1996 | | |
| GB | 2321869 A | * | 8/1998 | ........... B23K/35/28 |
| JP | 7003370 | 1/1995 | | |

* cited by examiner

Primary Examiner—Robert R. Koehler
(74) Attorney, Agent, or Firm—Stevens, Davis, Miller & Mosher, LLP

(57) ABSTRACT

The invention relates to a brazing sheet with a two-layer structure or a three-layer structure, having a core sheet made of an aluminium alloy core material and on one side or both sides thereof a brazing layer of an aluminium alloy containing silicon as main alloying element, wherein the aluminium alloy of the core sheet has the composition (in weight %)

| Mn | 0.5 to 1.5 |
| Cu | 0.5 to 2.0 |
| Si | 0.3 to 1.5 |
| Mg | <0.05 |
| Fe | <0.4 |
| Ti | <0.15 |
| Cr | <0.35 |
| Zr and/or V | <0.35 in total |
| Zn | <0.25 | balance aluminium and unavoidable impurities, and wherein said brazing sheet has a post-braze 0.2% yield strength of at least 50 MPa and having a corrosion life of more than 12 days in a SWAAT test without perforations in accordance with ASTM G-85, and further to a method of its manufacture.

25 Claims, No Drawings

BRAZING SHEET AND METHOD OF MAKING SAME

FIELD OF THE INVENTION

The invention is directed to brazing sheet having a core sheet of an aluminium alloy core material and a roll-bond or clad brazing layer of an aluminium alloy having silicon as the main alloying element, typically in the range of 5 to 14 weight %, on at least one side of the core sheet. The invention further relates to a method of manufacturing such a brazing sheet, and also to an assembly thus manufactured.

DESCRIPTION OF THE RELATED ART

In the prior art, aluminium alloys are the alloys of choice for heat exchanger applications. These alloys are selected for their desirable combination of strength, low weight, good thermal and electrical conductivity, brazeability, corrosion resistance, and formability.

Brazing sheet of this type set out above is well known in the art and is used extensively for automotive radiators, evaporators, condensers, charge air coolers, among other products. Two brazing methods, known as Controlled Atmosphere Brazing (CAB) employing a NOCOLOK (trade mark) flux and Vacuum Brazing, are conventional and need not be described here. The flux is a non-corrosive flux made up of a mixture of potassium and fluoro-aluminates. Such brazing takes place at a temperature of about 600° C. as determined by the aluminium silicon alloy of the brazing layer.

Commercial available brazing sheet which has very good brazeability by means of flux brazing, e.g. NOCOLOK brazing, comprises for example a core alloy cladded on one side with a brazing alloy, the core alloy having a composition, in weight %:

| | |
|---|---|
| Mn | 0.65–1.0 |
| Cu | 0.5–0.7 |
| Si | max. 0.3 |
| Fe | max. 0.5 |
| Zn | max. 0.10 |
| Ti | 0.08-0.10 | balance aluminium and impurities. Such brazing sheet is capable of obtaining a post-braze 0.2% yield strength typically in the range of up to 40 MPa and up to 48 MPa when the core is respectively subjected to a homogenisation treatment and not subjected to a homogenisation treatment between the processing steps of casting and hot deformation by means of hot-rolling. Moreover, the brazing sheet has a long-life corrosion performance as tested in a SWAAT-test in accordance with ASTM G-85. Long-life alloys are those which in the SWAAT test without perforations according to ASTM G-85 exceed 10 to 12 days.

There is a demand for brazing sheet which meet the requirements of excellent brazeability during flux brazing, while having improved post-brazed strength and simultaneously having a good corrosion resistance.

Alloys which have a high post-brazed strength and have a good corrosion resistance are known in the art. From EP-A-0718072, brazing sheet is known having a core sheet of an aluminium alloy core material and on at least one side thereof a brazing layer of an aluminium alloy containing silicon as a main alloying element, wherein the aluminium alloy of the core sheet has the composition (in weight %):

| | |
|---|---|
| Mn | 0.7–1.5 |
| Cu | 0.2–2.0 |
| Mg | 0.1–0.6 |
| Si | >0.15, most preferably >0.40 |
| Ti | optional, up to 0.15 |
| Cr | optional, up to 0.35 |
| Zr | and/or V optional, up to 0.25 in total, | balance aluminium and unavoidable impurities, and with the proviso that (Cu+Mg)>0.7, and most preferably (Cu+Mg)>1.2.

The alloying elements Cu and Mg are added to provide in combination a sufficient mechanical strength and corrosion resistance to the brazing sheet obtained. Although this brazing sheet may be processed by means of flux brazing, some difficulties are encountered due to the relatively high Mg content in the alloy which might influence the brazing flux applied during the brazing cycle. Further disadvantages of having a too high Mg-level in the core alloy, are that flow and/or wettabillity is decreased when applying the NOCOLOK brazing flux during the brazing cycle. However, lowering the Mg level in this known aluminium core material would drastically lower the strength levels obtainable after brazing.

Some other disclosures of literature will be mentioned below. JP-A-07003370 describes an aluminium core clad with an Al-Si filler metal to form a brazing sheet. The core alloy comprises, in weight %:

| | |
|---|---|
| Fe | 0.4 to 1.5 |
| Mn | 0.7–1.7 | with the proviso that (Fe+Mn)<2.4

| | |
|---|---|
| Si | 1.3 max. |
| Cu | 1.5 max. | with the proviso that (Si+Cu)>1.5 and with the further proviso that [Fe]+[Mn]>1.7[2.5 ([Si]+[Cu])] -4.2 balance aluminium and inevitable impurities.

GB-A-2321869 discloses an aluminium alloy brazing sheet comprising an Al-Si series filler alloy clad on one or both surfaces of an aluminium alloy core material comprising 0.3 to 1.5 wt. % of Cu and 0.03 to 0.3 wt. % of Sn, the balance of the alloy being substantially Aluminium. Corrosion resistance is improved by the combined addition of Cu and Sn in the given ranges.

From EP-A-0712681 a brazing sheet is known for a heat-exchanger tube with a three layer structure in a total thickness of not more than 0.25 mm, in which the core alloy comprises (in weight %):

| | |
|---|---|
| Si | 0.2–2.5 |
| Fe | 0.05–2.0 |
| Cu | 0.7–2.5 |
| Mn | 0.05–2.0 |
| Mg | optionally, not more than 0.5 |
| Cr | optionally, not more than 0.3 |
| Zr | optionally, not more than 0.3 |
| Ti | optionally, not more than 0.3 | balance aluminium and inevitable impurities, and is cladded on one side with a brazing material, and mandatorily cladded on the other side having a sacrificial anode clad layer with a thickness in the range of 46 to 70 micron, and said sacrificial anode clad layer comprises (in weight %)

| | | |
|---|---|---|
| | Zn | 3.0–6.0 |
| | Mg | 0.05–2.5 | balance aluminium and inevitable impurities,
During manufacture, all three layers are subjected after casting to a homogenisation treatment within a temperature range from 450 to 600° C. The hot rolling of the three layer structure is carried out at a temperature not lower than 450° C. Further Fe is deliberately added to the alloy in order to distribute the coarse intermetallic compounds into the alloy.

SUMMARY OF THE INVENTION

An object of the invention is to provide a brazing sheet having a core sheet made of an aluminium alloy core material and on one or both sides an aluminium brazing layer, providing improved brazeability in a flux brazing process, and having at least a 10% improvement of the post-braze 0.2% yield strength in both the situation where the core is being subjected to a homogenisation treatment and not being subjected to a homogenisation treatment, while maintaining a good corrosion resistance.

This object is achieved according to the invention, by providing a brazing sheet with a two-layer structure or a three-layer structure, having a core sheet made of an aluminium alloy core material and on one side or both sides thereof a brazing layer of an aluminium alloy containing silicon as a main alloying element, wherein the aluminium alloy of the core sheet has the composition (in weight %):

| | | |
|---|---|---|
| | Mn | 0.5 to 1.5 |
| | Cu | 0.5 to 2.0 |
| | Si | 0.3 to 1.5 |
| | Mg | <0.05 |
| | Fe | <0.4 |
| | Ti | <0.15 |
| | Cr | <0.35 |
| | Zr and/or V | <0.35 in total |
| | Zn | <0.25 | balance aluminium and unavoidable impurities.

This brazing sheet has good mechanical properties in the post-brazing state and is capable of providing an increase in post-braze 0.2% yield strength of at least 10% in both the situation where at least the core material is either or not subjected to a homogenisation treatment between the casting and the hot deformation processing step as compared to the known prior art brazing sheet set out above having a core alloy consisting of (in weight %):

| | | |
|---|---|---|
| | Mn | 0.65–1.0 |
| | Cu | 0.5–0.7 |
| | Si | max. 0.3 |
| | Fe | max. 0.5 |
| | Zn | max. 0.10 |
| | Ti | 0.08–0.10 | balance aluminium and impurities,
and having a post-braze 0.2% yield strength of typically in the range of up to 40 MPa and up to 48 MPa when the core is respectively subjected to a homogenisation treatment and not being subjected to a homogenisation treatment. In the case where the material is subjected to the homogenisation treatment the brazing sheet is capable of achieving in an 0-temper a post-braze 0.2% yield strength of at least 50 MPa, and in the best examples of at least 55 MPa. In the case where the material is not being subjected to the homogenisation treatment, the brazing sheet is capable of achieving, in an H24-temper, a post-braze 0.2% yield strength of at least 55 MPa, and in the best examples of at least 60 MPa. In at least both cases the brazing sheet in accordance with the invention has a good corrosion resistance. The brazing sheet is capable of obtaining a corrosion life of more than 12 days in a SWAAT test without perforations in accordance with ASTM G-85, and preferably more than 20 days. In the best examples, this corrosion resistance is more than 25 days. This level of corrosion resistance qualifies the brazing sheet as a long-life product. Further the brazing sheet can be processed very well by means of flux brazing, e.g. NOCOLOK brazing, due to the absence of Mg in the aluminium core alloy. It is believed that the excellent properties are the result of the specific combination of the contents of particularly Cu, Si, Fe, Mn, and Mg. Notably, the brazing sheet has a good corrosion resistance without the presence of a clad layer acting as a sacrificial anode on the side contacting aqueous cooling fluid in use.

In the invention, either on one or both faces of the core sheet have a brazing layer. The brazing layer may be a suitable Si-containing aluminium alloy brazing layer (filler layer) known in the art. Such layers may comprise 5 to 14% Si. In the case of the two-layer structure of brazing sheet, the brazing layer is present on one side of the core alloy, while the other side is devoid of a sacrificial clad layer. In the case of the three-layer structure of brazing sheet, the brazing layer is present on both sides of the core alloy.

The aluminium core alloy is of the Aluminium Association (AA)3xxx-series type, with Cu as one of the main alloying elements in order to obtain the desired strength level, in particular by means of solution hardening. At least 0.5% is required for obtaining the desired strength and corrosion resistance, while a Cu content of over 2.0% does not produce any significant improvements in respect of strength, and may further result in the formation of detrimental low-melting eutectics. A more preferred lower limit for the Cu level is 0.7%, and more preferably 0.8%. A more preferred Cu level is in a range of 0.8 to 1.5% in order to achieve an optimisation in the desired properties.

Si is another important alloying element in the core alloy according to this invention. The addition of Si results in an increased solution hardening of the alloy. Below 0.3% there is no effect of the Si, and above 1.5% it may result in the formation of detrimental low-melting eutectics and also in the formation of large intermetallic particles. A more suitable minimum level of Si is 0.40%. A suitable maximum level for Si is 1.0%, and more preferably a suitable maximum level for Si is 0.8%.

Mn is a further important alloying element in the core alloy of this invention. Below 0.5% there is not a sufficient effect, and above 2.0% it may result in the formation of detrimental large intermetallic particles. In a preferred embodiment the Mn is present in a range of 0.6 to 1.5%, and more preferably in the range of 0.7 to 1.4%. In this range the Mn present allows for a solid solution hardening effect because sufficient Mn is retained in solid solution for the desired increase in the post-braze strength.

For strength and corrosion resistance preferably the proviso (Cu+Mn)>1.5 is met, and more preferably (Cu+Mn) >1.8, and more preferably (Cu+Mn)>2.0.

Further, for strength and corrosion resistance preferably the proviso (Si+Mn)>1.2 is met, and more preferably (Si+Mn)>1.4.

Mg is not added deliberately to the aluminium alloy of the invention in order to improve the brazeability of the aluminium alloy during a flux brazing process, such as the NOCOLOK brazing. The maximum of Mg is 0.05%, and a more preferred maximum is 0.03%, and more preferably the Mg is absent.

Fe is present in all known aluminium alloys but in the aluminium alloys in accordance with the invention it is not required as an essential alloying element. With a too high Fe content, among other things, the formability of the brazing sheet decreases and the corrosion performance decreases. In addition, the post-braze strength might decrease due to the possible formation of detrimental FeCuAl-intermetallic particles. The admissible Fe content is 0.4% maximum, and preferably not more than 0.3% maximum.

The optionally added Cr improves, among other things, the strength of the aluminium alloy in the post-brazed condition, particularly in combination with the high Cu content. With a Cr content of more than 0.35% there is decreasing advantage in respect of the increase in strength, in particular due to the formation of detrimental large intermetallic particles. A more preferred maximum for Cr is taken at 0.25%. A more preferred level for Cr addition is in the range of 0.05 to 0.25%.

The optionally added Zr and/or V improves among other things the strength of the aluminium alloy in the post-brazed condition, and also the creep strength and the SAG resistance during brazing. A preferred maximum for these elements alone or in combination is 0.35%. A more suitable level of these elements alone or in combination is in the range of 0.05 to 0.25%.

Ti may be present up to 0.15% to act as a grain refining additive, but preferably is less than 0.1 and more preferably less than 0.05%.

Zn also may typically be present as an impurity, in an amount of less than 0.25%, and preferably less than 0.10%.

By unavoidable impurities is meant as is normal that any additional element is less than 0.05% and the total of such elements is less than 0.15%.

The strength in the post-brazing state can be evaluated by conducting a simulated brazing cycle, as is conventional in the art. The simulated brazing cycle used here is heating a specimen in a furnace and holding it at 590 to 610° C. for 5 minutes, followed by a controlled cooling with a cooling rate applicable in standard commercial brazing lines, namely 20 to 100° C./min.

In an embodiment of the brazing sheet according to the invention the aluminium core sheet, as set out above, is provided in an O-temper or in an H24-temper before the brazing sheet is subjected to a brazing cycle.

The invention also provides a method of manufacturing the brazing sheet of the invention, which comprises the steps:

(i) casting an ingot of the aluminium core alloy;
(ii) providing the aluminium core alloy with a brazing layer on at least one side;
(iii) hot rolling the aluminium core alloy with the brazing layer on at least one side;
(iv) cold-rolling, the aluminium core alloy with the brazing layer on at least one side, to the desired finished gauge, and wherein between steps (i) and (ii) the aluminium core alloy is not subjected to a homogenisation treatment. The cast alloy is only preheated to the desired starting temperature required for hot rolling. By avoiding the need for a homogenisation treatment the processing route is simplified, while the product allows for obtaining a further improved strength in the post-braze condition, and further is still capable of achieving a good corrosion resistance.

There are a number of ways to make a sheet from an ingot. For example, the ingot of the core alloy is cast.

The casting has a typical surface which needs to be removed. This removal is usually done, prior to the above-described preheating, by scalping and typically removed the surface for about 20 to 30 mm on each rolling side of the ingot. The ingot is usually not scalped in its thickness direction. The resultant scalped ingot generally has a thickness in the range of 250 to 400 mm. On top of this scalped ingot (sometimes also on the other side) a rolled plate of the brazing alloy is placed, typically in the range of 20 to 40 mm thickness.

Then a sandwich of the core alloy, and on one or both sides a plate is hot rolled to an intermediate plate product, and subsequently cold rolled to its final gauge. This way of manufacturing a brazing sheet is usually referred to as roll boding. In some instances, technologies other than roll bonding may be used.

In another aspect of the invention there is provided a brazed assembly, in particular a brazed heat exchanger, comprising at least two members bonded together by means of a brazing alloy, at least one of the members being of sheet material comprising the aluminium sheet of the invention described above as its core, and having an 0.2% yield strength of more than 50 MPa, and preferably of at least 55 MPa.

The brazing sheet in accordance with the invention will now be illustrated by a non-limitative examples.

Example

The following test was carried out on a laboratory scale of testing. Ingots of ten aluminium alloys for use as core alloys in brazing sheet were cast and solidified at a cooling rate comparable to those cooling rates that typically occur in conventional DC-casting. Table 1 gives the compositions of the alloys (balance aluminium and impurities), where alloys 8 to 10 are comparative alloys (indicate by "Comp"), and alloys 1 to 7 are alloys in accordance with the invention (indicate by "Inv.").

The alloys have been processed via two different processing routes. The alloys have been processed such that between casting and hot deformation by means of hot rolling, the material has not been subjected to a homogenisation treatment. Final sheets of material obtained via this route have been tested in an H-24 temper, which is a particular suitable condition for tube-stock applications. And the other processing route involved a homogenisation treatment applied after casting but prior to hot rolling, and comprised a heat treatment of 8 hours at 570° C. The materials obtained from the latter processing route have been tested in an O-temper condition, which included an end anneal for 3 hours at 350° C., which is a particular suitable condition for plate applications.

Mechanical properties were assessed for material having a final gauge of 0.38mm, and these properties are given in Table 2. The aluminium alloys were tested in the post-brazing state, i.e. after the simulated brazing cycle given above. Further, the corrosion resistance were assessed from similar material as for mechanical testing, which corrosion testing have been done in accordance with ASTM G-85. The results are also given in Table 2, in which table the term "n.t." stands for "not tested", and the term >28 means that the testing has been abolished after 28 days without failure of the sample.

From these results it can be seen that the alloys in accordance with the invention all achieve at least an 10% improvement in the post-braze 0.2% yield strength as compared to the prior art alloy (alloy 10) in comparable conditions. Due to the very low magnesium content in the alloys they demonstrate an excellent brazeability when processed via a brazing flux process. Alloys 2 and 5 demonstrate that addition of Cr and/or Zr may further increase the 0.2% yield strength as compared to alloy 1. Comparison of alloys 1 and 8 demonstrate that an increase in manganese content will results in an significant increase of the 0.2% yield strength, a similar trend that can be seen from the comparison of alloys 6 and 9. Comparison of the results of alloy 4 and 7 demonstrate that the 0.2% yield strength may further be increased by increasing the Si level in the aluminium alloy.

From the SWAAT-test results it can be seen that the material in accordance with this invention has a very good corrosion resistance. The results demonstrate that the addition of both Zr and Cr is not detrimental for corrosion resistance. However, a too high Fe content (alloy 3) is detrimental for corrosion resistance. Not all the examples in the O-temper have been tested, only samples from alloys 4 and 5. But the results demonstrate that a similar good corrosion resistance can be expected for the other alloys of this invention in the O-temper condition.

TABLE 1

| Alloy | | Alloying element, in weight % | | | | | | |
|---|---|---|---|---|---|---|---|---|
| | | Si | Mn | Cu | Mg | Fe | Cr | Zr | Ti |
| Inv. | 1 | 0.46 | 0.98 | 0.98 | 0.02 | 0.21 | — | — | 0.03 |
| Inv. | 2 | 0.48 | 0.99 | 0.99 | 0.01 | 0.23 | 0.14 | 0.11 | 0.03 |
| Inv. | 3 | 0.48 | 0.98 | 1.0 | 0.02 | 0.36 | — | — | 0.03 |
| Inv. | 4 | 0.47 | 1.35 | 0.97 | 0.01 | 0.22 | — | — | 0.03 |
| Inv. | 5 | 0.49 | 1.32 | 0.99 | 0.01 | 0.22 | 0.15 | 0.11 | 0.03 |
| Inv. | 6 | 0.46 | 0.99 | 1.45 | 0.01 | 0.22 | — | — | 0.03 |
| Inv. | 7 | 0.75 | 1.33 | 0.95 | 0.01 | 0.22 | — | — | 0.03 |
| Comp | 8 | 0.45 | 0.3 | 1.01 | 0.02 | 0.21 | — | — | 0.03 |
| Comp | 9 | 0.47 | 0.3 | 1.52 | 0.02 | 0.21 | — | — | 0.03 |
| Comp | 10 | 0.07 | 0.98 | 0.66 | 0.02 | 0.22 | — | — | 0.03 |

TABLE 2

| | Post-braze 0.2% yield strength [MPa] | | SWAAT-test [days] | |
|---|---|---|---|---|
| Alloy | Non-homog. H-24 temper | Homog. O-temper | Non-homog. H-24 temper | Homog. O-temper |
| 1 | 57 | 51 | 25 | n.t. |
| 2 | 66 | n.t. | >28 | n.t. |
| 3 | 57 | 50 | 13 | n.t. |
| 4 | 61 | 52 | >28 | >28 |
| 5 | 69 | 58 | >28 | >28 |
| 6 | 59 | 55 | >28 | n.t. |
| 7 | 63 | 56 | >28 | n.t. |
| 8 | 42 | 42 | n.t. | n.t. |
| 9 | 46 | 50 | n.t. | n.t. |
| 10 | 48 | n.t. | 22 | 26 |

Having now fully described the invention, it will be apparent to one of ordinary in the art that many changes and modifications can be made without departing the spirit or scope of the invention as set forth by the claims appended hereto.

What is claimed is:

1. A brazing sheet with a two-layer structure or a three-layer structure, having a core sheet made of an aluminium alloy core material and on one side or both sides thereof a brazing layer of an aluminium alloy containing silicon as a main alloying element, wherein the aluminium alloy of the core sheet consists of the composition (in weight %):

| Mn | 0.5 to 1.5 |
|---|---|
| Cu | 0.8 to 2.0 |
| Si | 0.3 to 1.5 |
| Mg | <0.05 |
| Fe | <0.4 |
| Ti | <0.15 |
| Cr | <0.35 |
| Zr and/or V | <0.35 in total |
| Zn | <0.25 | balance aluminium and unavoidable impurities, and wherein said brazing sheet has a post-braze 0.2% yield strength of at least 50 MPa and has a corrosion life of more than 12 days in a SWAAT test without perforations in accordance with ASTM G-85, wherein said brazing sheet is devoid of a sacrificial anode layer.

2. Brazing sheet according to claim 1, wherein the Mg content in said composition of the aluminium alloy of the core sheet is less than 0.03%.

3. Brazing sheet according to claim 1, wherein the Mn content in said composition of the aluminium alloy of the core sheet is in the range of 0.6 to 1.5%.

4. Brazing sheet according to claim 3, wherein the Mn content in said composition of the aluminium alloy of the core sheet is in the range of 0.7 to 1.4%.

5. Brazing sheet according to claim 1, wherein the Cu content in said composition of the aluminium alloy of the core sheet is in the range of 0.8 to 1.5%.

6. Brazing sheet according to claim 1, wherein the Si content in said composition of the aluminium alloy of the core sheet is in the range of 0.4 to 1.0%.

7. Brazing sheet according to claim 1, having in the post-brazing state a corrosion life of more than 20 days in a SWAAT test without perforations in accordance with ASTM G85.

8. Brazing sheet according to claim 1, wherein the core sheet is prior to brazing in an O-temper or in an H-24 temper.

9. Brazing sheet according to claim 1 in the form of tube stock material.

10. Method of making brazing sheet according to claim 1, comprising the steps of:

(i) casting an ingot of said aluminium alloy core material;

(ii) applying said brazing layer to said one or both sides of said core sheet of said aluminium alloy core material, wherein said core sheet is made from the ingot;

(iii) hot rolling said aluminium core material sheet and said brazing layer(s) to form a hot rolled product;

(iv) cold rolling the hot rolled product to desired final gauge, wherein between steps (i) and (ii) said aluminium alloy core material is not subjected to a homogenization treatment.

11. Brazed assembly comprising a brazing sheet according to claim 1.

12. A brazed heat exchanger comprising a brazing sheet according to claim 1.

13. Core aluminium alloy for application in a two-layer or a three-layer brazing sheet structure, wherein the alloy consists of the composition (in weight %):

| | |
|---|---|
| Mn | 0.5 to 1.5 |
| Cu | 0.95 to 2.0 |
| Si | 0.3 to 1.5 |
| Mg | <0.05 |
| Fe | <0.4 |
| Ti | <0.15 |
| Cr | <0.35 |
| Zr and/or V | <0.35 in total |
| Zn | <0.25 | balance aluminium and unavoidable impurities.

14. A core aluminium alloy according to claims 13, wherein the Mg content in said composition of the aluminium alloy of the core sheet is less than 0.03%.

15. A core aluminium alloy according to claim 13, wherein the Mn content in said composition of the aluminium alloy of the core sheet is in the range of 0.6 to 1.5%.

16. A core aluminium alloy according to claim 13 wherein the Mn content in said composition of the aluminium alloy of the core sheet is in the range of 0.7 to 1.4%.

17. A core aluminium alloy according to claim 13, wherein the Cu content in said composition of the aluminium alloy of the core sheet is in the range of 0.95 to 1.5%.

18. A core aluminium alloy according to claim 13, wherein the Si content in said composition of the aluminium alloy of the core sheet is in the range of 0.4 to 1.0%.

19. A brazing sheet with a two-layer structure or a three-layer structure, having a core sheet made of an aluminium alloy core material and on one side or both sides thereof a brazing layer of an aluminium alloy containing silicon as a main alloying element, wherein the aluminium alloy of the core sheet consists of the composition (in weight %):

| | |
|---|---|
| Mn | 0.5 to 1.5 |
| Cu | about 0.8 to 2.0 |
| Si | 0.3 to 1.5 |
| Mg | <0.05 |
| Fe | <0.4 |
| Ti | <0.15 |
| Cr | <0.35 |
| Zr and/or V | <0.35 in total |
| Zn | <0.25 | balance aluminium and unavoidable impurities, and wherein said brazing sheet has a post-braze 0.2% yield strength of at least 50 MPa and has a corrosion life of more than 20 days in a SWAAT test without perforations in accordance with ASTM G-85.

20. Brazing sheet according to claim 19, wherein the Cu content in said composition of the aluminum alloy of the core sheet is in the range of about 0.95–2.0%.

21. A brazing sheet with a two-layer structure or a three-layer structure, having a core sheet made of an aluminium alloy core material and on one side or both sides thereof a brazing layer of an aluminium alloy containing silicon as a main alloying element, wherein the aluminium alloy of the core sheet consists of the composition (in weight %):

| | |
|---|---|
| Mn | 0.5 to 1.5 |
| Cu | 0.5 to 2.0 |
| Si | 0.3 to 1.5 |
| Mg | <0.05 |
| Fe | <0.4 |
| Ti | <0.15 |
| Cr | <0.35 |
| Zr and/or V | <0.35 in total |
| Zn | <0.25 | balance aluminium and unavoidable impurities, wherein said brazing sheet has a post-braze 0.2% yield strength of at least 50 MPa and has a corrosion life of more than 12 days in a SWAAT test without perforations in accordance with ASTM G-85 and wherein the core sheet is prior to brazing in an O-temper or in H-24 temper.

22. A brazing sheet, formed by the process of claim 10.

23. Brazing sheet according to claim 1, wherein the Si content in said composition of the aluminium alloy of the core sheet is in the range of 0.46 to 1%.

24. Brazing sheet according to claim 1, wherein the Fe content in said composition of the aluminium alloy of the core sheet is less than 0.3%.

25. A brazing sheet with a two-layer structure or a three-layer structure, having a core sheet made of an aluminium alloy core material and on one side or both sides thereof a brazing layer of an aluminium alloy containing silicon as a main alloying element, wherein the aluminium alloy of the core sheet consists of the composition (in weight %):

| | |
|---|---|
| Mn | 0.5 to 1.5 |
| Cu | about 0.8 to 2.0 |
| Si | 0.3 to 1.5 |
| Mg | <0.05 |
| Fe | <0.4 |
| Ti | <0.15 |
| Cr | <0.35 |
| Zr and/or V | <0.35 in total |
| Zn | <0.25 | balance aluminium and unavoidable impurities, and wherein said brazing sheet has a post-braze 0.2% yield strength of at least 50 MPa and has a corrosion life of more than 12 days in a SWAAT test without perforations in accordance with ASTM G-85, wherein the core alloy has not been homogenized.

* * * * *